UNITED STATES PATENT OFFICE.

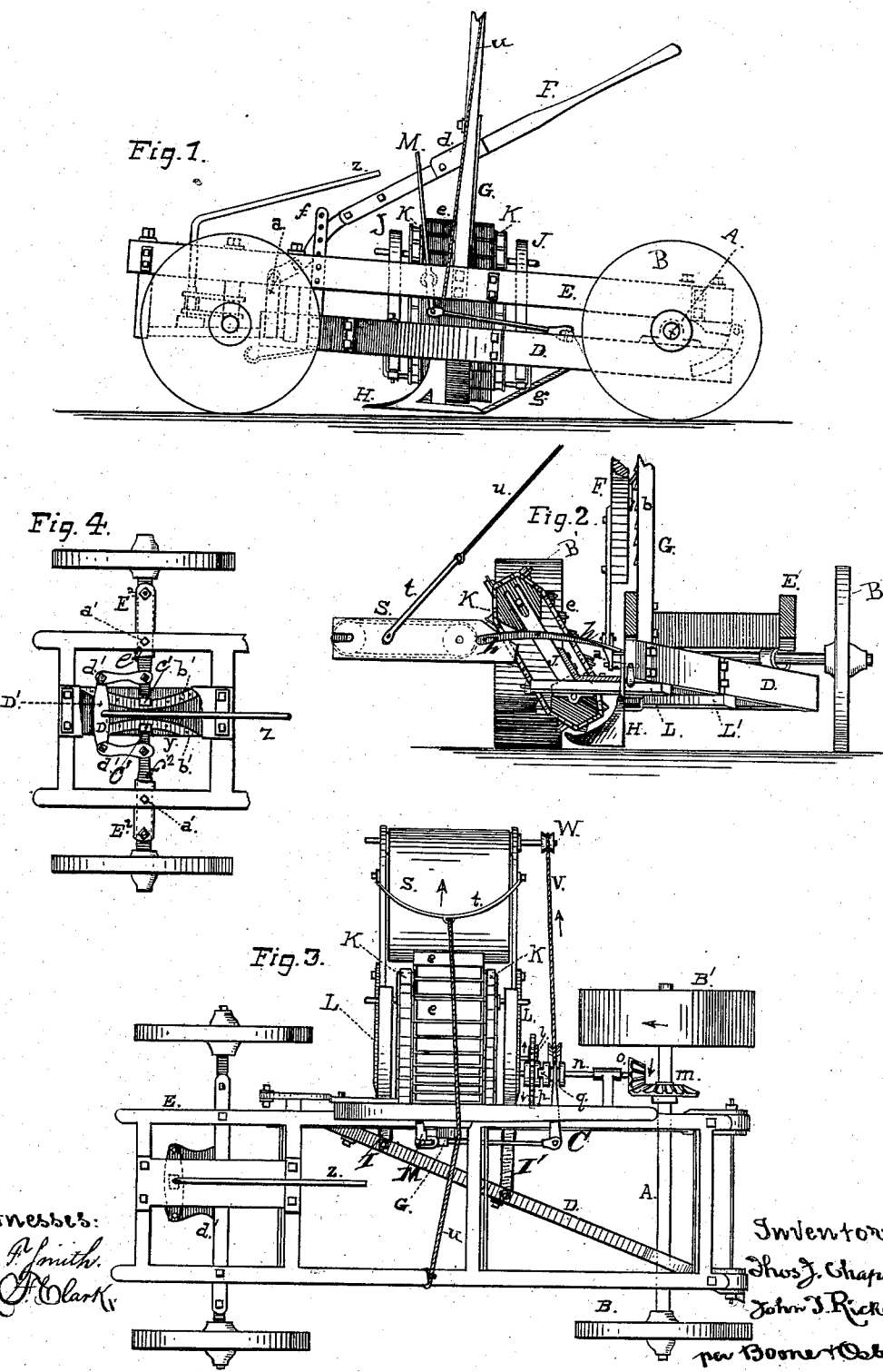

THOMAS J. CHAPPELL AND JOHN T. RICKETTS, OF GILROY, CALIFORNIA.

DITCHING AND EMBANKING MACHINE.

SPECIFICATION forming part of Letters Patent No. 235,622, dated December 21, 1880.

Application filed February 25, 1880. (Model.)

*To all whom it may concern:*

Be it known that we, THOMAS J. CHAPPELL and JOHN T. RICKETTS, of Gilroy, Santa Clara county, in the State of California, have invented certain new and useful Improvements in Ditching and Embanking Machines; and we do hereby declare that the following is a full, clear, and exact description thereof, reference being had to the accompanying drawings.

Our invention has reference to that class of ditching and embanking machines in which a ditching-plow, an elevator, and an endless conveyer are combined with a four-wheeled wagon, so as to be operated by the forward motion and traction of the wagon.

The nature of our invention consists in combining with a side elevator and its operating mechanism a beam suspended from the axle and pivoted or hinged to the rear end of frame, and having a plow with a side extension and adjusting or lowering and raising mechanism, substantially as hereinafter more fully set forth.

Referring to the accompanying drawings, Figure 1 is a side elevation of our improved machine. Fig. 2 is a front view with the front wheels and a part of the frame broken off. Fig. 3 is a plan view. Fig. 4 is a detail view of the front wheels and the steering-gear.

Let A represent the rear axle of a four-wheeled vehicle, and B B' the two rear wheels. To this axle we secure the rear end of the plow-beam. This plow-beam consists of a beam, C, which extends directly forward from near one end of the axle, and another bracing or diagonal beam, D, which extends from near the opposite end of the axle, and has its forward end secured by bolts to the forward end of the beam C. The rear ends of these beams extend a short distance in rear of the axle.

The forward end of the wagon-frame E rests upon the bolster of the forward axle, and its rear end extends over the rear axle and is hinged to the rear ends of the plow-beams C D. The beam C will then pass directly forward under one of the side beams of the wagon-frame, according to which side the plow is intended to be mounted on—that is, if the plow is to be operated on the right-hand side of the wagon the beam C will be on that side; but if it is to be operated on the left-hand side the position of the beams must be reversed. We have represented the beam C on the right-hand side of the wagon. The forward end of the plow-beam extends nearly to the front axle of the wagon, and it is raised or lowered and held in any desired position by means of a lever, F, the forward end of which is attached to an arm, a, which projects upward from the forward end of the plow-beam. This lever has its fulcrum on the side of the wagon-timber and extends back toward the rear end of the wagon.

G is a post or mast, which is secured to the wagon-frame, and which has a rack, b, secured to or formed on it. The lever has a bent plate, d, secured to its side, which engages with the rack at whatever position it is moved to. By raising or lowering the rear end of this lever the front end of the plow-beam is raised or lowered, as desired. $f f$ are guides, which extend upward from the forward end of the plow-beam, on each side of the frame-beam above.

The plow H is secured to the beam C by means of a standard, in the usual way, midway between the axles, so that it is lowered into the ground or raised out of it when the beam C is raised and lowered by the lever.

The rear end of the land-side of the plow is connected to the beam C by a brace, g, which holds it rigidly in place against the strain of plowing. The mold-board of the plow is extended toward the rear of the wagon, and is made concave, as shown.

A short beam, I, is secured transversely across the under side of the plow-beam, in front of the plow, so as to project a short distance outward from the wagon and plow frames, and another, I', is secured in like manner in rear of the plow. A beam, J, is secured in an angular position to the outer ends of each of these beams I I', so as to extend outward and upward. Between these beams I I' and J J' the endless bucket-elevator is mounted, its lower end passing around a drum or shaft, which bears in boxes on the under side of the horizontal beams I I', while its upper end passes around a shaft which bears in the upper ends of the angular beams J J'. This endless elevator is composed of two endless chains, K K, having buckets *e e* connecting them, and its position is such that as its buckets pass down around the lower drum or shaft they move in the concave extension of the plow mold-board, so as to scoop up the earth raised by the plow. The lower drum or shaft around which this endless elevator passes has a spur-wheel, $l$, on it, and this wheel and shaft are driven from the rear axle of the wagon by means of the bevel-wheel $m$ on the rear axle and a horizontal shaft, $n$, which is mounted on bearings projecting from the plow-beam C, and which carries a bevel-pinion, $o$, on its rear end and a loose spur-wheel, $p$, on its forward end. The bevel-pinion $o$ engages with the bevel-wheel $m$ on the axle, while the loose spur-wheel $p$ engages with the spur-wheel $l$ on the elevator-shaft. A clutch, $q$, slides on a feather on the shaft $n$, and is operated by a lever, M, so that it can be thrown into gear with the loose wheel $p$, or disengaged from it, as desired.

The rear bearing-wheel, B', is a broad-faced wheel, so as to give a large amount of traction power for driving the elevator mechanism.

Horizontal braces $h$ connect the upper side of the plow-beam C with the angular elevator-beams J J', so as to give it the proper support, and these braces extend outward beyond the elevator to a short distance. Between the ends of these extended braces the end of a horizontal endless belt or draper, S, is hinged, so that the outer end of the draper can be raised or lowered. This draper extends outward from one side of the wagon to the desired distance, and its outer end is supported by a bail, $t$, and rope $u$, which passes over the upper end of the post or mast G, and thence down to the opposite side of the wagon, to which it is secured. The draper is thus supported in position to receive the earth which is raised by the elevator-buckets when the buckets pass over the upper drum or shaft. This draper or endless carrier is driven by a belt-connection, $v$, with the lower elevator-drum, and a pulley, $w$, on the end of the outer shaft, around which the belt passes.

It will now be noticed that the plow is secured to one side of the wagon, midway between the forward and rear wheels, and that the elevator receives the dirt from the plow and carries it up at right angles to the wagon-frame and dumps it upon the endless carrier, which also extends at right angles to the wagon-frame, the relative arrangement being shown in Figs. 2 and 3. The elevator and endless carrier could also be adjusted so as to raise the earth and carry it directly across the wagon-frame and deliver it on the opposite side of the wagon. For railroad work this latter arrangement will be very convenient.

This device is applied to the front axle, which we make in two parts, $e^2 f^2$, as shown at Fig. 4. Each half-axle is made to carry a wheel on its outer end, and it is pivoted to the bolster by a bolt, $a'$, which passes down through the outer end of the bolster and through the axle, as shown. Underneath the bolster we construct a narrow platform, $y$, on which are two curved tracks, $b'$ $b'$, which curve in opposite directions. The inner end of each half-axle passes above this platform, and has a roller, $c'$, on its extremity, and these rollers bear and move upon the tracks $b$ $b$.

D' is a lever-bar, which is pivoted at its middle to the platform, and which is arranged to be moved by a lever, $z$, which extends upward and backward to within easy reach of the driver. Each end of the centrally-pivoted lever is connected with the inner end of one of the half-axles by connecting-bars $d'$, so that when the lever is moved in either direction the inner ends of the half-axles are moved in opposite directions and the wheels placed in proper position to describe short curves. This arrangement is very simple and convenient, and enables us to direct the machine without difficulty.

Having thus described our invention, what we claim, and desire to secure by Letters Patent, is—

In an excavator, the combination, with the side elevator and its operating mechanism, of the beam D C, suspended from the axle and pivoted or hinged to the rear end of the frame E, and having the plow H, with a side extension, and adjusting or lowering and raising mechanism, substantially as and for the purpose set forth.

In witness whereof we have hereunto set our hands and seals.

THOMAS J. CHAPPELL. [L. S.]
JOHN T. RICKETTS. [L. S.]

Witnesses:
E. H. FARMER,
C. H. REMINGTON.